United States Patent
Merklein et al.

[11] Patent Number: 5,969,518
[45] Date of Patent: *Oct. 19, 1999

[54] ANTIFRICTION MOUNTING HAVING A ROTATIONAL-SPEED MEASURING DEVICE PROTECTED FROM CONTAMINATION

[75] Inventors: Harald Merklein, Schweinfurt; Rainer Breitenbach, Gochsheim; Heinrich Hofmann, Schweinfurt; Roland Langer, Schwanfeld; Peter Niebling, Bad Kissingen, all of Germany

[73] Assignee: FAG Automobiltechnik AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,737
[22] Filed: Oct. 6, 1997
[30] Foreign Application Priority Data Oct. 28, 1996 [DE] Germany ............... 196 44 744

[51] Int. Cl.⁶ .................. F16C 19/08; F16C 32/00; G01P 3/488; B60T 8/72
[52] U.S. Cl. .................. 324/173; 324/207.25; 384/448
[58] Field of Search ................ 324/173, 174, 324/207.25, 166, 168; 384/448

[56] References Cited

U.S. PATENT DOCUMENTS 5,523,681  6/1996  Hajzler et al. .
5,575,568  11/1996  Rigaux et al. ............ 324/174

FOREIGN PATENT DOCUMENTS 0327434  8/1989  European Pat. Off. .
0594550  4/1994  European Pat. Off. .

Primary Examiner—Walter E. Snow
Attorney, Agent, or Firm—Ostrolenk, Faber, Gerb & Soffen, LLP

[57] ABSTRACT

An antifriction mounting includes a bearing having an inner and an outer ring and rolling bodies between them. A seal closes the lateral side of the bearing between the rings. A pulse generator is rotatable with a rotatable one of the rings, which is either the inner or the outer ring. A non-ferromagnetic cover is outside the pulse generator and also seals the opening into the space between the rings. A rotational speed sensor on or outside the cover scans the pulse generator magnetically without hindrance from the non-ferromagnetic cover. Radio signals may transmit other information besides rotation speed. Appropriate transmitters and receivers for those signals can be placed at the pulse generator and/or the sensor.

12 Claims, 3 Drawing Sheets

5,969,518

ANTIFRICTION MOUNTING HAVING A ROTATIONAL-SPEED MEASURING DEVICE PROTECTED FROM CONTAMINATION

BACKGROUND OF THE INVENTION

The invention relates to an antifriction mounting including a bearing with a rotation speed indicator and relates to a seal for the bearing and for part of the indicator.

There is a need to provide many types of antifriction mountings with a device for detecting rotational speed. Thus, the prior art discloses fitting a wheel bearing of a motor vehicle with a rotational speed detector, for example, to derive the speed from the signals obtained and to use the speed information to control an antilock system. For this purpose, a pulse generator is fastened to a rotating bearing part, and a stationary rotational speed sensor is arranged in the immediate vicinity of the pulse generator so that it can detect the position or movement of the pulse generator part.

An antifriction bearing having a pulse generator disk integrated into the seal at one axial side of the bearing is disclosed in DE 37 35 070 A1. This pulse generator disk has the form of a perforated plate. The position of the perforated plate can be detected, for example, by a suitable arrangement of a permanent magnet and a HALL sensor. The disadvantage of this principle is that damage occurs to the perforated plate pulse generator, which is arranged outside on the bearing.

EP-A 0 607 719 A1 discloses integrating an elastomer pulse generator, magnetized in a multipolar fashion, into the rotating bearing seal such that it is situated on the outside as a centrifugal disk. The magnetic multipolar generator has the advantage that the sensor head can be kept small. However, this arrangement has the disadvantage that the multipole magnet is open to the outside, enabling magnetic particles to be attracted from the environment. These particles accumulate on the pulse generator surface and lead to short circuiting of the magnets. They can cause false signals, reaching as far as functional failure of the rotational speed measuring system.

SUMMARY OF THE INVENTION

It is therefore the object of the invention to protect the pulse generator in a simple way against environmental damage, particularly against interfering magnetic particles.

An antifriction mounting includes a bearing having an inner and an outer ring and rolling bodies between them. A seal at the lateral side of the bearing closes off the space between the rings. A pulse generator is rotatable along with a rotatable one of the rings, which is either the inner or the outer ring. A non-ferromagnetic cover is positioned outside the pulse generator and also seals the opening into the space between the rings. A rotational speed sensor on or outside the cover scans the pulse generator magnetically without hindrance from the non-ferromagnetic cover. Radio signals may transmit other information besides rotation speed. Appropriate transmitters and receivers for those signals can be placed at the pulse generator and/or the sensor.

The pulse generator, which is perforated, embossed or magnetized in a multipolar fashion, is fastened in the interior of the bearing, on the rotating bearing ring and in the region of the bearing seal which is toward an axial side. Protection against environmental influences, particularly magnetic particles, is achieved using a cover over the outside of the pulse generator. It is an essential that the material of the cover be non-ferromagnetic, for example, specific stainless steels, non-ferrous metals or plastics.

Because non-ferromagnetic materials do not influence permanent magnetic fields, the pulse generator is able to scan magnetically through the cover without affecting the magnetic measuring principle. The achievable maximum distance between the pulse generator and sensor is thus not shortened by the presence of the cover.

Since the pulse generator has been arranged outside on the bearing as a part rotating openly, the sensor has had to be mounted at a safe distance from the generator with loss of air gap, in order to prevent the sensor from grazing the pulse generator. This fastening also had the disadvantage of creating relatively large tolerance chains for the size of the air gap between the pulse generator and the sensor. If the cover according to the invention is now fastened on the fixed bearing ring, the sensor may be fastened directly to the stationary cover, or the sensor may be pressed directly against the cover. The tolerance chain for the air gap can therefore be shortened. The remaining individual tolerances can thus be selected to be larger, resulting in cost saving in producing the individual parts.

Furthermore, the cover according to the invention also permits transmission of a possible additional radio signal for the purpose of transmitting further data (for example bearing temperature and accelerations) out of the bearing and through the cover.

Other features and advantages of the present invention will become apparent from the following description of two exemplary embodiments of the invention which refers to the accompanying drawings.

DESCRIPTION OF PREFERRED EMBODIMENTS OF THE INVENTION

Figure 1:
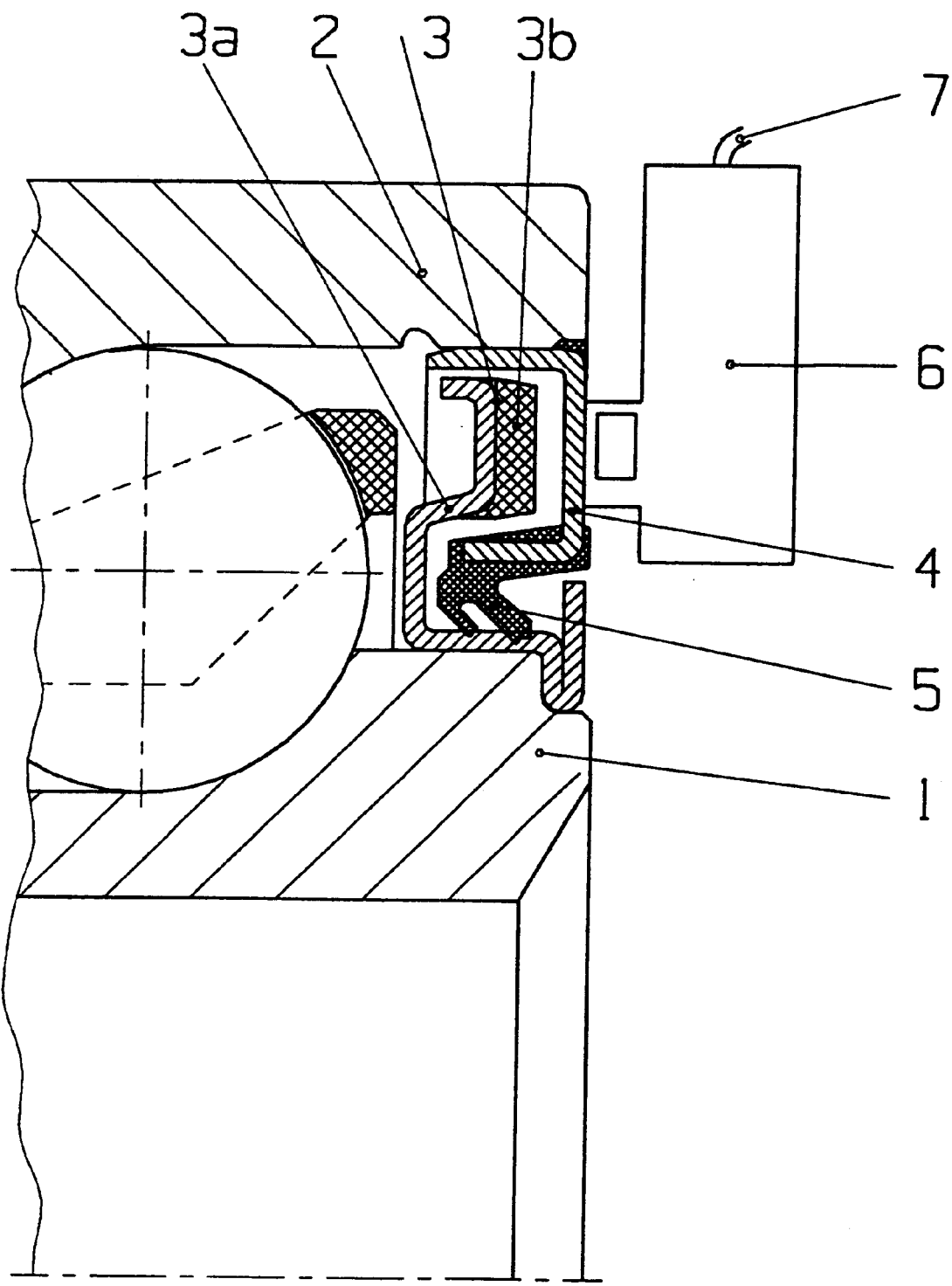
FIG. 1 is a sectional representation of the sealing area of an antifriction mounting according to the invention and having a rotating inner ring.

FIG. 1 shows a mounting or bearing including an inner bearing ring 1, which is rotatable around its axis, an outer bearing ring 2 outside of and spaced from the inner ring 1 and stationary with respect to the inner ring and rolling bodies in an annular row guided along the opposed races of the rings. The bearing has a space between the rings which is sealed at one axial or lateral side of the bearing, as described below.

A pulse generator ring 3 comprising a retaining plate 3a and a pulse ring 3b magnetized in a multipolar fashion is mounted on the rotating bearing inner ring 1 by the plate 3a being fastened to the inner ring 1. The pulse ring 3b may comprise, for example, an elastomer body which is filled with magnetic particles and which is vulcanized onto the retaining plate 3a. The pulse ring 3b may be of a form selected from the group consisting of essentially a metal toothed wheel, a corrugated ring, a corrugated disk, a perforated ring, a perforated disk, a ring magnetized in a multipolar fashion, or a disk magnetized in a multipolar fashion. Instead of a magnetic pulse ring, it is also possible to use non-magnetized ferromagnetic pulse rings such as toothed disks, perforated disks or corrugated disks. The sensor would then be equipped with an operating magnet.

A cover 4 is disposed axially outward of the ring 3 and over the space between the bearing rings 1 and 2. The cover 4 is made from a non-ferromagnetic material selected from the group consisting of stainless steel, non-ferrous metal and plastic. It is fastened to the stationary outer ring 2, and protects the pulse generator ring 3 against environmental influences, e.g. dirt. Sealing lips 5 made from elastomeric material are vulcanized on the cover 4 and engage the pulse generator ring 3 on the inner ring 1 for better sealing of the bearing. The sensor 6, which can be a Hall sensor or magnetoresistive sensor, for example, bears directly against the cover 4. The sensor signals are relayed to an evaluation unit via a cable 7.

Figure 2:
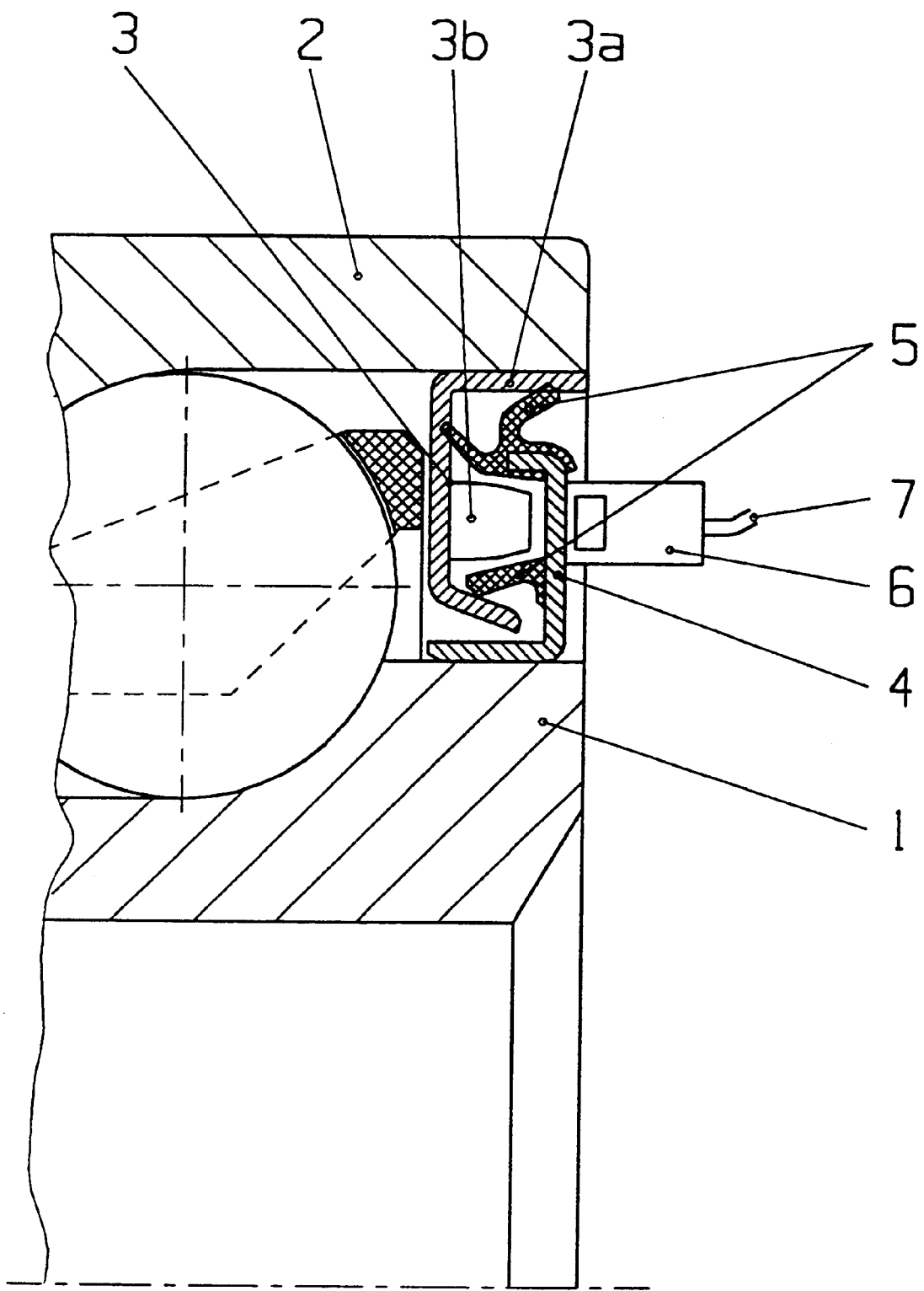
FIG. 2 is a sectional representation of the sealing area of an antifriction mounting according to the invention and having a rotating outer ring.

A variant of the invention useful for bearings having a rotating outer ring 2 is shown in FIG. 2. In this case, the pulse generator ring 3 is fastened to the inside of the outer ring 2, and the cover 4 is fitted on the non-rotating inner ring 1 and covers the space between the rings. As in FIG. 1, the cover 4 has sealing lips 5 which are vulcanized on the cover and is in direct contact with the sensor 6. The sensor 6 relays the signals read out from the pulse generator ring 3 to an evaluation unit via a cable 7.

Figure 3:
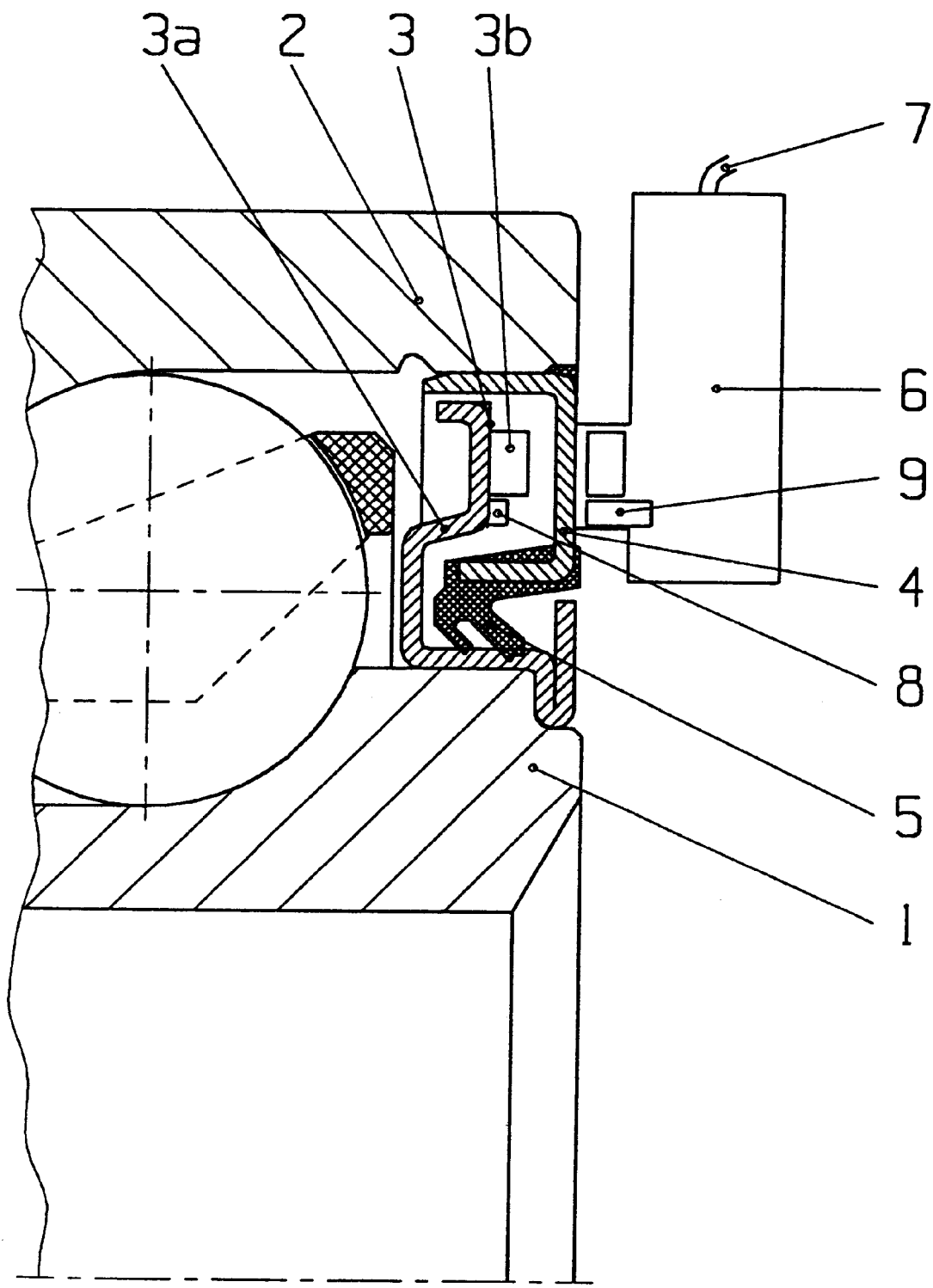
FIG. 3 is a sectional representation of the sealing area of an antifriction mounting according to the invention and having an additional device for radio transmission.

The bearing variant in FIG. 3 corresponds to the variant of FIG. 1 with regard to the rotational speed measuring device. In addition, however, a radio transmitter 8 and a radio receiver 9 integrated into the sensor 6 are fitted to the pulse generator part 3. These radio components can detect and report on other bearing operating conditions, like bearing temperature, acceleration, etc. The radio transmitter 8 is therefore located in the interior of the bearing in a fashion where it is well protected against environmental influences. The radio link leads to the outside through the cover 4, which does not shield off radio waves. The radio transmission can also be designed so that a transceiving unit is arranged in the sensor 6. Via an interrogation pulse, the transceiving unit interrogates the switching state of an electronic circuit which is arranged on the pulse generator part 3 instead of the radio transmitter 8. The radio link likewise leads through the cover, which does not shield off radio waves.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antifriction mounting, including a wheel bearing, wherein the bearing includes an inner bearing ring, an outer bearing ring radially outward of the inner ring, and rolling bodies between the inner and outer rings, wherein there is a space between the inner and outer rings which opens at a lateral side of the bearing;
   one of the rings being rotatable relative to the other of the rings which is stationary with reference to the rotatable ring;
   a bearing seal for sealing the opening between the rings at the lateral side of the bearing;
   a rotational speed sensor for the bearing comprising:
      a rotating pulse generator at the inside of the seal toward the bearing, the pulse generator being connected with the rotatable ring for rotating therewith;
      a non-ferromagnetic stationary cover supported on the stationary ring and positioned axially outward of the pulse generator with reference to the bearing, whereby the cover protects against introduction of undesired materials into the space between the rings;
      a sensor outward of the cover with reference to the bearing for sensing a signal from the pulse generator.

2. The mounting of claim 1, wherein the sensor is fastened directly to the cover.

3. The sensor of claim 1, wherein the pulse generator includes a part selected from the group consisting of a metal tooth wheel, a corrugated ring, a corrugated disk, a perforated ring, a perforated disk, a ring magnetized in a multipolar fashion and a disk magnetized in a multipolar fashion.

4. The mounting of claim 3, wherein the cover is made of a material selected from the group consisting of stainless steel, non-ferrous metal, and plastic.

5. The mounting of claim 1, wherein the cover is made of a material selected from the group consisting of stainless steel, non-ferrous metal, and plastic.

6. An antifriction mounting, including a wheel bearing, wherein the bearing includes an inner bearing ring, an outer bearing ring radially outward of the inner ring, and rolling bodies between the inner and outer rings, wherein there is a space between the inner and outer rings which opens at a lateral side of the bearing;
   one of the rings being rotatable relative to the other of the rings which is stationary with reference to the rotatable ring;
   a bearing seal for sealing the opening between the rings at the lateral side of the bearing;
   a rotational speed sensor for the bearing comprising:
      a rotating pulse generator at the inside of the seal toward the bearing, the pulse generator being connected with the rotatable ring for rotating therewith,
      a non-ferromagnetic stationary cover supported on the stationary ring and positioned outward of the pulse generator with reference to the bearing, whereby the cover protects against introduction of undesired materials into the space between the rings,
      a sensor outward of the cover with reference to the bearing for sensing a signal from the pulse generator;
   a radio transmitter in the vicinity of the pulse generator for transmitting a signal concerning the bearing; and
   a radio receiver in the vicinity of the sensor for sensing the radio signal from the radio transmitter, the transmitter being inside the cover toward the bearing and the receiver being outside the cover.

7. The mounting of claim 6, wherein the radio transmitter is integrated into the pulse generator and the radio receiver is integrated into the sensor.

8. An antifriction mounting, including a wheel bearing, wherein the bearing includes an inner bearing ring, an outer bearing ring radially outward of the inner ring, and rolling bodies between the inner and outer rings, wherein there is a space between the inner and outer rings which opens at a lateral side of the bearing;
   one of the rings being rotatable relative to the other of the rings which is stationary with reference to the rotatable ring;
   a bearing seal for sealing the opening between the rings at the lateral side of the bearing;
   a rotational speed sensor for the bearing comprising:
      a rotating pulse generator at the inside of the seal toward the bearing, the pulse generator being connected with the rotatable ring for rotating therewith,
      a non-ferromagnetic stationary cover supported on the stationary ring and positioned outward of the pulse generator with reference to the bearing, whereby the cover protects against introduction of undesired materials into the space between the rings, a sensor outward of the cover with reference to the bearing for sensing a signal from the pulse generator;

an electronic circuit arranged in the vicinity of the pulse generator; and a transceiving unit in the vicinity of the sensor for transmitting a radio signal to the electronic circuit and for receiving a signal from the electronic circuit.

9. The mounting of claim 8, wherein the electronic circuit is integrated into the pulse generator and the transceiving unit is integrated into the sensor.

10. The mounting of claim 1, wherein the bearing inner ring is the relatively rotatable ring to which the pulse generator is attached and the outer ring is the relatively stationary ring.

11. The mounting of claim 1, wherein the bearing outer ring is the relatively rotatable ring to which the pulse generator is attached and the inner ring is the relatively stationary ring.

12. The mounting of claim 1, wherein the cover is attached to the stationary one of the rings;

a sealing lip extending from the cover to the rotatable one of the rings, wherein the cover and the lip seal entry into the space between the bearing rings.

* * * * *